(12) United States Patent
Edmiston et al.

(10) Patent No.: US 9,269,323 B2
(45) Date of Patent: Feb. 23, 2016

(54) IMAGE LAYOUT FOR A DISPLAY

(75) Inventors: Greg Edmiston, Seattle, WA (US);
David Benjamin Zearing, Sammamish, WA (US); Emmanuel Miranda-Steiner, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 363 days.

(21) Appl. No.: 13/284,251

(22) Filed: Oct. 28, 2011

(65) Prior Publication Data

US 2013/0106913 A1    May 2, 2013

(51) Int. Cl.
*G09G 5/00* (2006.01)
*G06F 3/14* (2006.01)
*G09G 5/12* (2006.01)
*G09G 5/14* (2006.01)

(52) U.S. Cl.
CPC .. *G09G 5/00* (2013.01); *G06F 3/14* (2013.01); *G09G 5/12* (2013.01); *G09G 5/14* (2013.01); *G09G 2340/045* (2013.01); *G09G 2340/0407* (2013.01); *G09G 2340/0442* (2013.01); *G09G 2340/0464* (2013.01); *G09G 2340/0492* (2013.01); *G09G 2340/145* (2013.01)

(58) Field of Classification Search
CPC ........................................................ G06T 15/30
USPC ........................................................ 345/620
See application file for complete search history.

(56) References Cited

U.S. PATENT DOCUMENTS

| | | | |
|---|---|---|---|
| 5,960,126 A * | 9/1999 | Nielsen et al. | 382/298 |
| 6,456,745 B1 * | 9/2002 | Bruton et al. | 382/298 |
| 6,636,648 B2 | 10/2003 | Loui et al. | |
| 6,711,297 B1 * | 3/2004 | Chang et al. | 382/240 |
| 7,340,676 B2 | 3/2008 | Geigel et al. | |
| 7,548,936 B2 | 6/2009 | Liu et al. | |
| 7,843,466 B2 * | 11/2010 | Hanechak | 345/619 |
| 7,904,455 B2 | 3/2011 | Chiu et al. | |
| 7,961,938 B1 * | 6/2011 | Remedios | 382/162 |
| 8,094,132 B1 * | 1/2012 | Frischling et al. | 345/173 |
| 8,218,895 B1 * | 7/2012 | Gleicher et al. | 382/275 |
| 8,429,517 B1 * | 4/2013 | Damera-Venkata et al. | 715/205 |
| 8,498,451 B1 * | 7/2013 | Agopian et al. | 382/118 |
| 8,561,106 B1 * | 10/2013 | Taylor et al. | 725/41 |

(Continued)

OTHER PUBLICATIONS

Automatic Thumbnail Cropping and its Effectiveness;Bongwon Suh, Haibin Ling, Benjamin B. Bederson, David W. Jacobs; 2003.*

(Continued)

*Primary Examiner* — Javid A Amini
(74) *Attorney, Agent, or Firm* — Julie Kane Akhter; Danielle Johnston-Holmes; Micky Minhas

(57) ABSTRACT

One or more techniques and/or systems are disclosed for efficiently organizing one or more images in a display. The display may comprise one or more display lines, such as display rows or display columns. Images can be selected sequentially from an image database and scaled to fill into a display line, at least until a selected image does not fit. If the selected image does not fit, a cropping amount can be determined for the images in the display line, including the image that does not fit, and the images can be proportionally cropped accordingly. The cropping amount can comprise merely enough display space to accommodate a cropped version of the image that does not fit into the display line. The cropped version of the image can then be filled into the display line, and, if available, a next display line can similarly be populated.

20 Claims, 12 Drawing Sheets

(56) References Cited

U.S. PATENT DOCUMENTS

| | | | |
|---|---|---|---|
| 8,736,664 B1* | 5/2014 | Gruenig | 348/36 |
| 2004/0008356 A1* | 1/2004 | Fujisawa et al. | 358/1.2 |
| 2004/0080670 A1* | 4/2004 | Cheatle | 348/441 |
| 2004/0128317 A1* | 7/2004 | Sull et al. | 707/104.1 |
| 2005/0055635 A1* | 3/2005 | Bargeron et al. | 715/525 |
| 2005/0143124 A1* | 6/2005 | Kennedy et al. | 455/556.1 |
| 2005/0216832 A1* | 9/2005 | Giannetti | 715/513 |
| 2006/0176376 A1* | 8/2006 | Dyke et al. | 348/222.1 |
| 2006/0193008 A1* | 8/2006 | Osaka et al. | 358/1.18 |
| 2006/0197780 A1* | 9/2006 | Watkins et al. | 345/620 |
| 2006/0265417 A1* | 11/2006 | Amato et al. | 707/102 |
| 2006/0281993 A1* | 12/2006 | Pedrizzetti et al. | 600/443 |
| 2007/0136685 A1* | 6/2007 | Bhatla et al. | 715/800 |
| 2009/0100096 A1* | 4/2009 | Erlichson et al. | 707/104.1 |
| 2009/0220165 A1 | 9/2009 | Liu et al. | |
| 2009/0254814 A1* | 10/2009 | Lai et al. | 715/244 |
| 2010/0142853 A1* | 6/2010 | Fillion et al. | 382/298 |
| 2011/0012929 A1 | 1/2011 | Grosz et al. | |
| 2011/0069085 A1* | 3/2011 | Weber et al. | 345/620 |
| 2011/0074824 A1 | 3/2011 | Srinivasan et al. | |
| 2012/0140020 A1* | 6/2012 | Rosenberg et al. | 348/14.07 |
| 2012/0204098 A1* | 8/2012 | Venkata | 715/243 |
| 2013/0300875 A1* | 11/2013 | Strandemar et al. | 348/164 |

OTHER PUBLICATIONS

Bederson, Benjamin B., "Quantum Treemaps and Bubblemaps for a Zoomable Image Browser", Retrieved at <<http://citeseerx.ist.psu.edu/viewdoc/download?doi=10.1.1.79.988&rep=rep1&type=pdf>>, User Interface Systems and Technology, 2001, pp. 1-10.

Wallick, Michael N., "Automatic Organization of Large Photo Collections", Retrieved at <<http://www.cs.wisc.edu/graphics/Papers/Theses/michaelw.pdf>>, 2007, pp. 119.

McCarthy, Stuart, "Exploring User Interactions for an Online Photo-Sharing Application", Retrieved at <<http://www.cs.bath.ac.uk/~mdv/courses/CM30082/projects.bho/2007-8/McCarthy-SA-dissertation-2007-8.pdf>>, Apr. 2008, pp. 137.

"Algorithm to organise rectangles in the fixed rectangular container", Retrieved at <<http://stackoverflow.com/questions/5119734/algorithm-to-organise-rectangles-in-the-fixed-rectangular-container>>, Retrieved Date: Aug. 8, 2011, pp. 3.

Janik, Oliver, "Web application for management of family photos", Retrieved at <<https://dip.felk.cvut.cz/browse/pdfcache/janiko1_2008bach.pdf>>, Jul. 10, 2008, pp. 51.

* cited by examiner

IMAGE LAYOUT FOR A DISPLAY

BACKGROUND

In computing environments, images can be retrieved from an image database and displayed on a variety of display screens, such as computer monitors, handheld devices, and others. Further, images can be displayed in a variety of formats. Commonly, when an image database comprises a collection of images a plurality of thumbnail versions of the images can be displayed on a screen together. A "thumbnail view" may be a visualization of a collection of photos, such as from a folder, in which a large number or all of the photos are visible on the display and remaining photos can be observed by a simple scrolling action. Often, when a user wishes to view images from the image database, which can contain a few or thousands of images, they continually browse a displayed selection (e.g., scroll through) until they find a desired image or images. Additionally, images can be comprised of different sizes, aspect ratios, and layouts; and a user may be able to specify a size of a thumbnail version for preferred viewing on a display. Image layouts for a display can vary depending on an image size, image aspect ratio, and/or a layout design for displaying images.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In a computing environment, when a user wishes to view a plurality of images in a display, on a screen, they have typically been limited to one or more uniform packing arrangements. For example, when images are retrieved from an image database, such as from a search query, the display can render a limited number of some of the images from all of those that may be available in the database. Uniform image displays have some limitations, however. For example, uniformly displaying images typically limits the size, location, and/or number of images to be displayed. Due to these limitations, the resulting images may be excessively cropped or scaled to fit a certain area and/or the details cannot be distinguished because the resolution does not appropriately fit the displayed image size. Further, a substantial amount of display space is left blank (whitespace), often up to 70%, when using a uniform packing arrangement.

These problems can be particularly exacerbated when the user is accessing the images from a mobile device screen, which is often very limited in size. An ability to display images from an image database to a user in an efficient manner may thus be hampered by uniform packing arrangements. Also, when a user zooms into or out of a "thumbnail view" the images may be excessively cropped and/or display space can be additionally wasted, as the images are typically not arranged in a manner that mitigates "white space" (e.g., unused screen space).

Accordingly, one or more techniques and/or systems are disclosed where images can be displayed to a user in an arrangement, such that the images comprise an aspect ratio similar to original aspect ratios for the images, for example, and where "whitespace" can be mitigated. Further, the display layout of the images may be dynamic, such that the efficient layout can be maintained when the display is changed (e.g., resized, presented on a different sized screen, etc.). As an example, the images can be filled into a display line (e.g., row and/or column) until a last image does not fit. In this example, an amount of additional display space needed to "fit" the last image can be cropped from the respective images in the display line, such that the last image can be filled into the display line.

In one embodiment of organizing one or more images in a display, an image can be filled into a first display line if a size of the image is not greater than an amount of remaining display space in the first display line. Further, one or more images that are already filled into the first display line can be cropped, if the size of the image is greater than the amount of the remaining display space. The cropping can result in an amount of additional display space that, when combined with the amount of the remaining display space, is sufficient to accommodate a cropped version of the image in the first display line. Additionally, if the size of the image is greater than the amount of the remaining display space, the cropped version of the image can be filled into the first display line, resulting in the organized images in the display.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
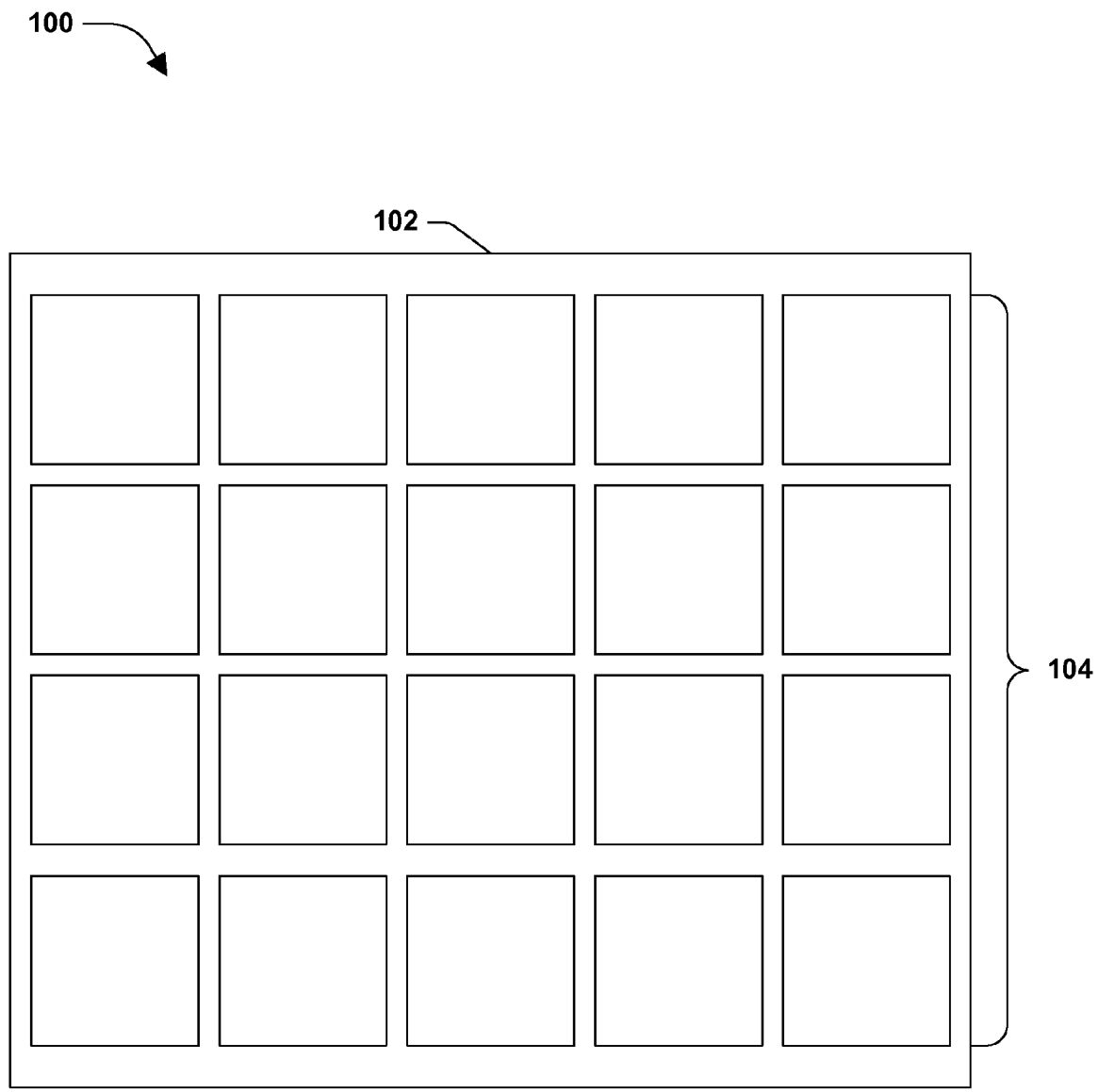
FIG. 1 is an illustration of an example display where images may be square cropped.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Images (e.g., photo images) are typically rectangular, comprising an aspect ratio of 4:3, 3:2, 16:9, etc., or their transposes. Images displayed on a display of a computing device (e.g., desktop monitor, laptop monitor, television, portable device screen, component screen, etc.), for example, can be displayed in a variety of ways. A variety of techniques may be used to provide for displaying a plurality of images on a display, for example, to provide a desirable packing arrangement of images (e.g., depending on screen size, user preference, default arrangements, etc.). As an example, techniques for packing the image can comprise cropping and/or scaling the image to fit into a predefined display size.

FIG. 1 is an illustration of an example display 100 where images may be square cropped. In this example 100, a display area 102, such as from a computer monitor or mobile device, may comprise a plurality of images 104. In this example 100, the images 104 are displayed in a thumbnail view (e.g., reduced size), where more than one image may be displayed at a same time. Further, in order to display a larger number of images in an organized arrangement, the images 104 have been square cropped. As an example, when square cropping an image, the sides and/or top and bottom of the image can be removed to create a square shaped thumbnail. Typically, a center of the image is chosen and surrounding parts of the center that fit within a predefined cropping square are displayed. The remaining parts that are outside the cropping square are not displayed in the thumbnail view in the display area 102. Inherently, in this format, portions of the image content are lost when the thumbnail images 104 are cropped. Moreover, a substantial amount of the images may be lost given that the images may be different sizes but have to end up the same size. That is, some (larger) images may have to be cropped substantially to be the same size as other (smaller) images such that a fair amount of content is lost from those (larger) images during cropping.

Figure 2:
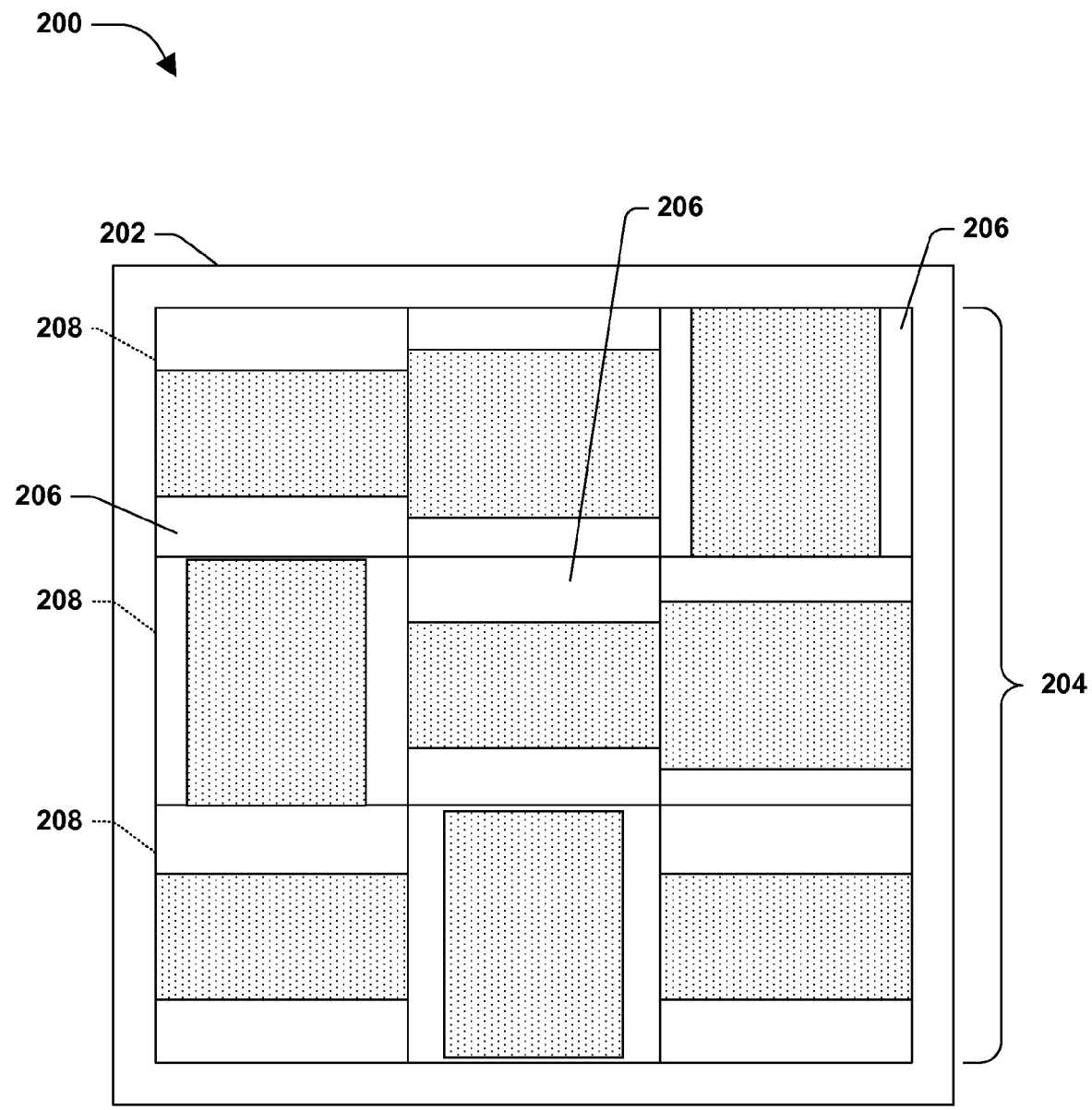
FIG. 2 is an illustration of an alternate example display where images may be inscribed into same sized display boxes.

FIG. 2 is an illustration of an alternate example display 200 where images may be inscribed into same sized display boxes. In this example 200, a display area 202 comprises a plurality of (thumbnail) images 204. However, in this example 200, the respective images 204 are fit into display boxes 208 that are respectively of a same size. As an example, regardless of whether the image is a portrait or landscape format (e.g., or some other aspect ratio), the image may be sized appropriately to fit merely within a display box 208. Inherently, in this example 200, image quality (e.g., reduced resolution, and/or increased distortion) may be lost when an image is sized up or down to fit inside a display box 208. Further, this type of display can create an undesirable amount of "white space" 206 (e.g., unused portions of the display area 202) between images 204.

Figure 3:
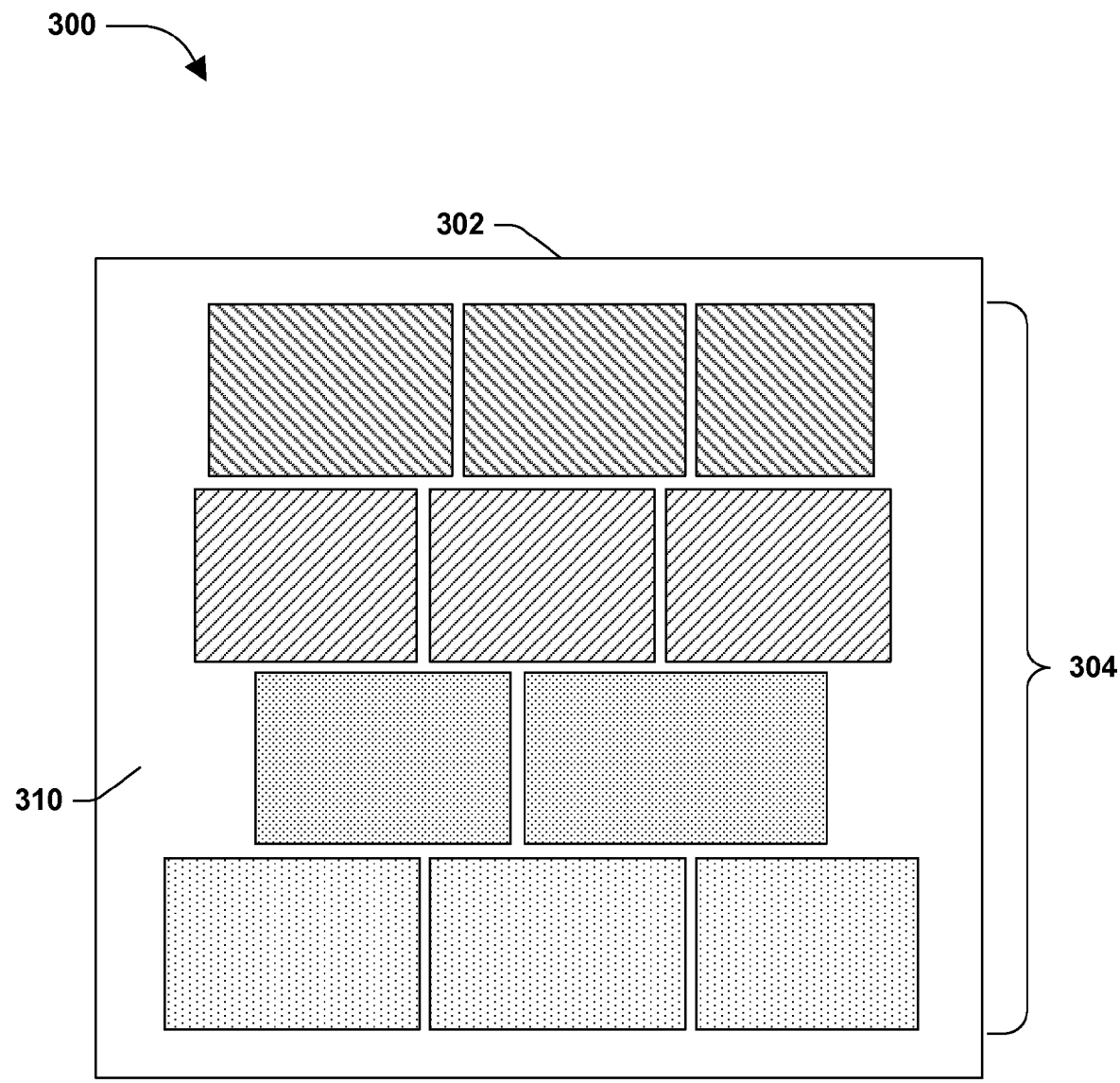
FIG. 3 is an illustration of an alternate example display where images may be constrained to a same height in the display.

FIG. 3 is an illustration of an alternate example display 300 where images may be constrained to a same height in a display. In this example 300, a display area 302 may comprise a plurality of (thumbnail) images 304. In this example 300, the images 304 are height constrained so that a row height for the images is fixed. Height constrained (e.g., or width constrained) thumbnail images can be cropped (e.g., from the top, bottom, or sides), and/or distorted to fit within the height (e.g., or width) constraints. Again, in this example, image quality may be reduced (e.g., reduced resolution, and/or increased distortion, etc.) and/or some of the image content can be lost during cropping. Further, in this example 300, the images are often center justified, which can create a fair amount of "white space" 310 on either side of the images 304.

As provided herein, one or more methods may be devised that provide for an improved arrangement of images (e.g., such as thumbnails) in a display, where the images may be displayed at a similar aspect ratio of the original image, and the arrangement may mitigate whitespace (e.g., wasted display space). Further, a dynamic layout may be provided, such as where the display may be resized (e.g., zoom in/out), and/or for different display sizes (e.g., computer monitor, portable device screen). In one embodiment, using one or more of the techniques described herein, a display row in the display can be filled with images, and when a last image is filled in the row, merely a portion of respective images in the row can be proportionally cropped to accommodate the last image.

Figure 4:
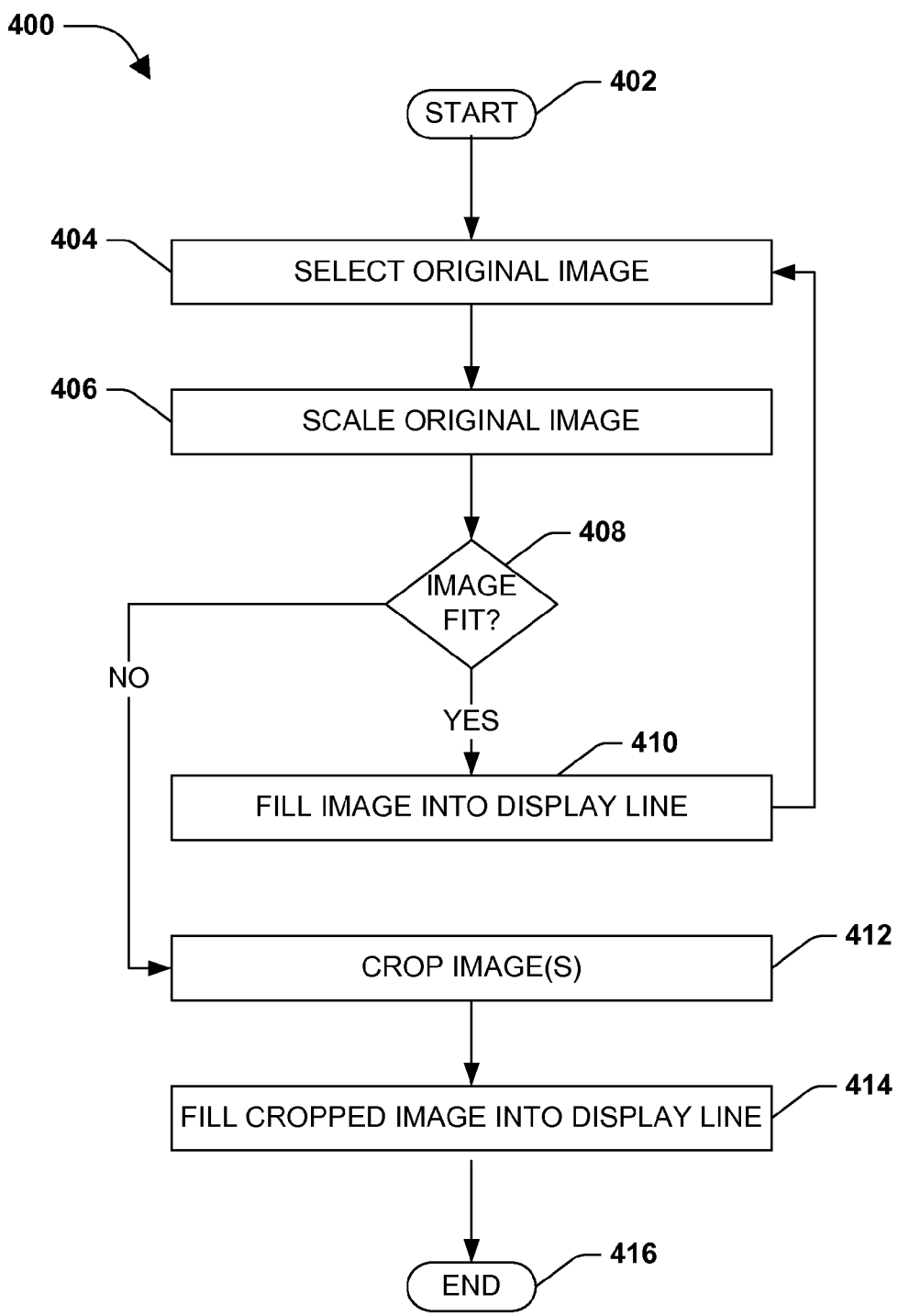
FIG. 4 is a flow diagram illustrating an exemplary method for organizing one or more images in a display.

FIG. 4 is a flow diagram illustrating an exemplary method 400 for organizing one or more images in a display. The exemplary method 400 begins at 402. At 404, a first original image can be selected for filling into the display. As one example, a user of a device may wish to view at least a portion of a collection of images on a display connected with (e.g., or comprised in) the device. In this example, the collection may be stored locally on the device (e.g., or on remotely connected storage), such as in an album of images (e.g., stored by the user, or from another source selected by the user). In one example, the first image may be selected automatically (e.g., programmatically) from the collection.

Further, it will be appreciated that a display may comprise merely a portion of viewable area of a display screen. As an example, a display screen (e.g., monitor, embedded screen, etc.) used by a computing device may comprise a viewable area, portions of which can be used to render different displays at a same or different times. As an illustrative example, a user may open a first "window" on a computer monitor to view first content, and open a second "window" to view second content, where the first and second windows are respectively comprised within the viewable area of the monitor (e.g., display screen thereof) at the same time. In one example, a first display may be opened on the monitor and resized to a first desired size comprising a first desired area of the monitor's viewable area. In this example, a second display may be opened on the monitor and resized to a second desired size comprising a second desired area of the monitor's viewable area. It will be appreciated that, in these examples, the first and the second desired sizes may comprise a same or different size, and that the first and second desired areas may thus comprise a same or different area of the monitor's viewable area. Further, it will be appreciated that the first and/or second display may comprise the viewable area of the monitor (e.g., where the first and second displays overlap one another) or merely a portion thereof (e.g., where the first and second displays do not (completely) overlap one another).

At 406, the first original image can be scaled for display, resulting in a first image. As an example, the first original image can be scaled to a "thumbnail" sized image that may fit into at least a portion of the display of a device. Typically, when displaying a portion of a collection of images, for example, the images are scaled to "thumbnails" (e.g., smaller versions of a full-sized image) so that more than one image may be displayed at a same time. Further, in one embodiment, the original image may be scaled to a size that can fit into a display line of the display. As an example, displaying the portion of the collection of images may comprise arranging the images into one or more display lines (e.g., rows and/or columns of images).

At 408, it may be determined whether the first image fits into a first display line for the display. As an example, the first original image may be scaled (e.g., comprising an appropriate width and/or height) to fit into the first display line, but if the first display line comprises one or more other images there may or may not be enough display space left in the first display line to accommodate the first image. As an example, the display line may comprise a row of one thousand color elements (e.g., pixels), and the first image may comprise a width of two hundred color elements. Where there is at least two hundred color elements of display space left in the first display line, the first image may "fit" into the first display line (e.g., regardless of whether other images are already filled into the first display line).

If the first image does fit into the first display line (YES at 408), the first image can be filled into the first display line, at 410. At 404, a second original image may be selected, for example, from the collection of images stored and/or selected by the user. At 406, the second original image can be scaled, for example, to a thumbnail image that comprises an appropriate width and/or height for the first display line. At 408, it may be determined whether the second image "fits" into the first display line. As an example, as described above, if the remaining display space in the first display line can accommodate the size (e.g., number of pixels wide for a row, and/or number of pixels high for a column) the second image may fit into the first display line. At 410, the second image can be filled into the first display line (e.g., if the second image "fits" into the first display line as determined at 408).

As one example, the process 404 to 410 may be iterated until the image does not fit into the first display line. That is, for example, a third, fourth, etc. original image may be selected, scaled and filled into the first display line until the remaining display space in the first display line is less than an amount of display space comprised by the image. As an example, the remaining display space in the first display line may comprise forty color elements (e.g., due to a first, second and third, etc. images filled into the first display line), and the image (e.g., a scaled fourth image) may comprise one hundred color elements of display space. In this example, the image does not fit in the first display line as the remaining display space is less than the size of the image.

If the image does not fit in the first display line (NO at 408), the one or more images that are already filled into the first display line (e.g., the first, second and third images), and the image that does not fit into the first display line (e.g., the fourth image), can be cropped at 412. The cropping can result in an amount of additional display space that may be sufficient to accommodate the cropped version of the image (e.g., the cropped fourth image) when combined with the remaining display space. As one example, if the remaining display space in the first display line comprises forty color elements, and the image (e.g., the scaled fourth image) comprises one hundred color elements of display space, an amount of cropping (e.g., resulting in the additional display space) can comprise sixty color elements (e.g., forty plus sixty equals one hundred, equivalent to the size of the fourth image).

In this example, the additional display space (e.g., in the amount of sixty color elements wide and/or high) can indicate how much of respective images already filled in the first display line, and the image being filled into the first line, to crop. As one example, the amount of sixty color elements (e.g., sixty pixels) can be divided amongst the respective images being filled in to the first display line (e.g., the first, second and fourth images), and the respective images can be cropped accordingly (e.g., fifteen pixels per image). In this way, for example, by cropping an amount of up to sixty color elements from the respective images that are intended to fill the first display line the cropped image (e.g., the fourth image) can fit into the first display line.

At 414, the cropped and image (e.g., fourth image) can be filled into the first display line. As one example, the first display line can comprise first, second, third and fourth cropped and images, where the amount cropped from the images (e.g., adding the amount cropped from the respective images in the first display line) is equivalent to the amount of additional display space needed to accommodate the cropped fourth image. Having filled the cropped, scaled image into the first row, the exemplary method 400 ends at 416. In one embodiment, the process 404 to 414 may be iterated for a second display line, for example, where a fifth, etc. original image is selected, scaled and filled into the second display line; and for a third display line, etc., until a desired number of display lines (e.g., rows and/or columns) are filled for the display.

Figure 5:
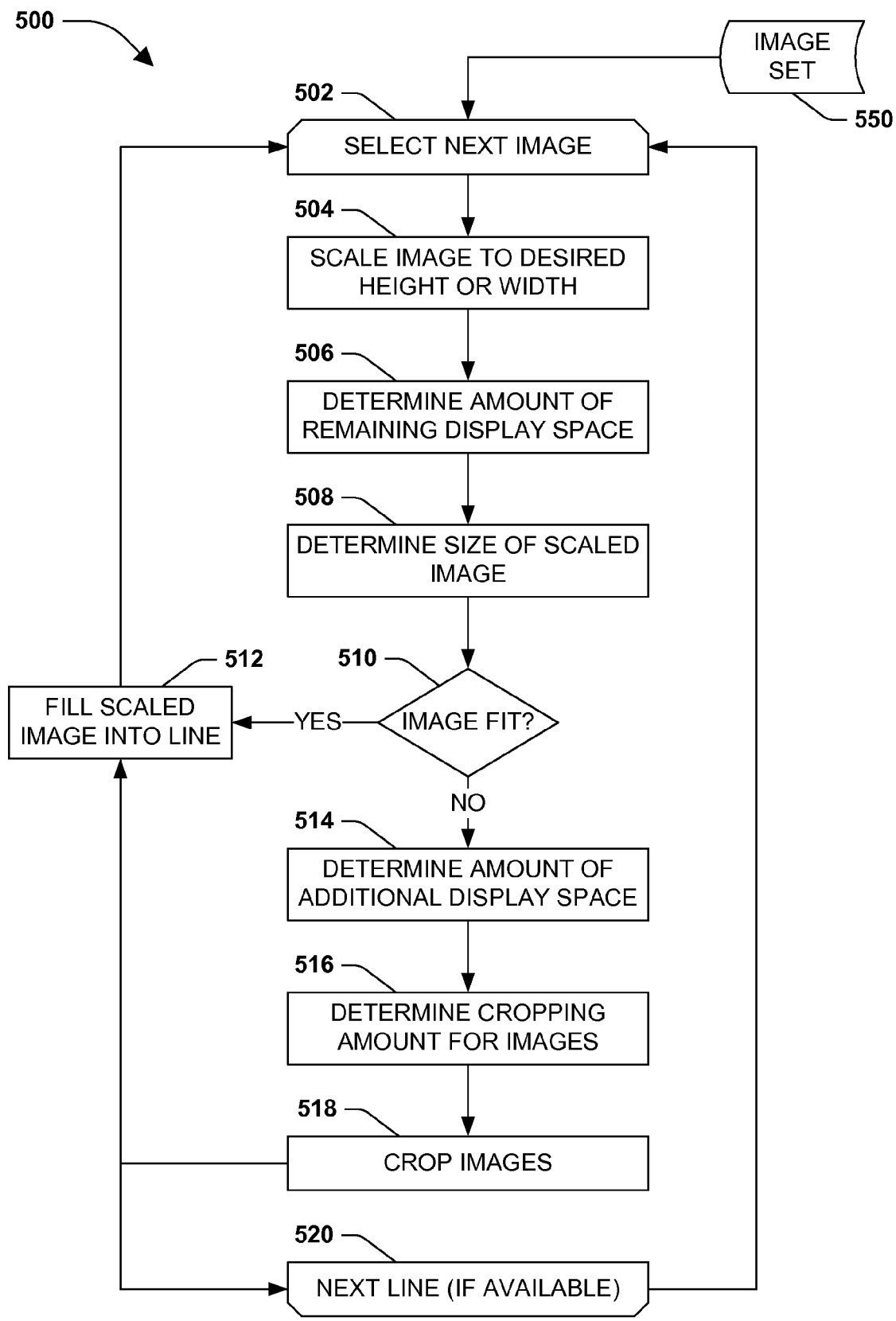
FIG. 5 is a flow diagram illustrating an example embodiment where one or more portions of one or more techniques described herein may be implemented.

FIG. 5 is a flow diagram illustrating an example embodiment 500 where one or more portions of one or more techniques described herein may be implemented. At 502 in the example embodiment 500, an iterative process (e.g., 502 to 520) begins. A next available image can be selected from a set of images 550, at 502. As one example, the set of images may comprise a collection (e.g., in one or more albums) of images saved and/or selected by a user (e.g., photos taken, images captured, images received and/or downloaded online, etc.). As an example, the user may have one or more local folders comprising a collection of images stored by the user. As another example, the user may access one or more remote folders (e.g., in the cloud) comprising a collection of images saved by the user. As yet another example, the user may select a collection of images online, such as by performing an online image search (e.g., using query terms to select the collection of images returned by the search). It will be appreciated that the set of images may comprise one or more images from one or more locations (e.g., local and/or remote), and the set may comprise images to be selected for displaying in a display.

In one embodiment, the set of images 550 may comprise sequentially arranged images, and the images may be selected (e.g., at 502) incrementally from the set 550. That is, for example, the set of images 550 may comprise a sequential arrangement, such as by date, by preference (e.g., a user preference), by size, by type, by order of relevance (e.g., for a query term), or by some other sequential arrangement, and an image selected first may comprise a first image in the sequence of the set, an image selected second may comprise a second image in the sequence of the set, and so on.

Figure 6A:
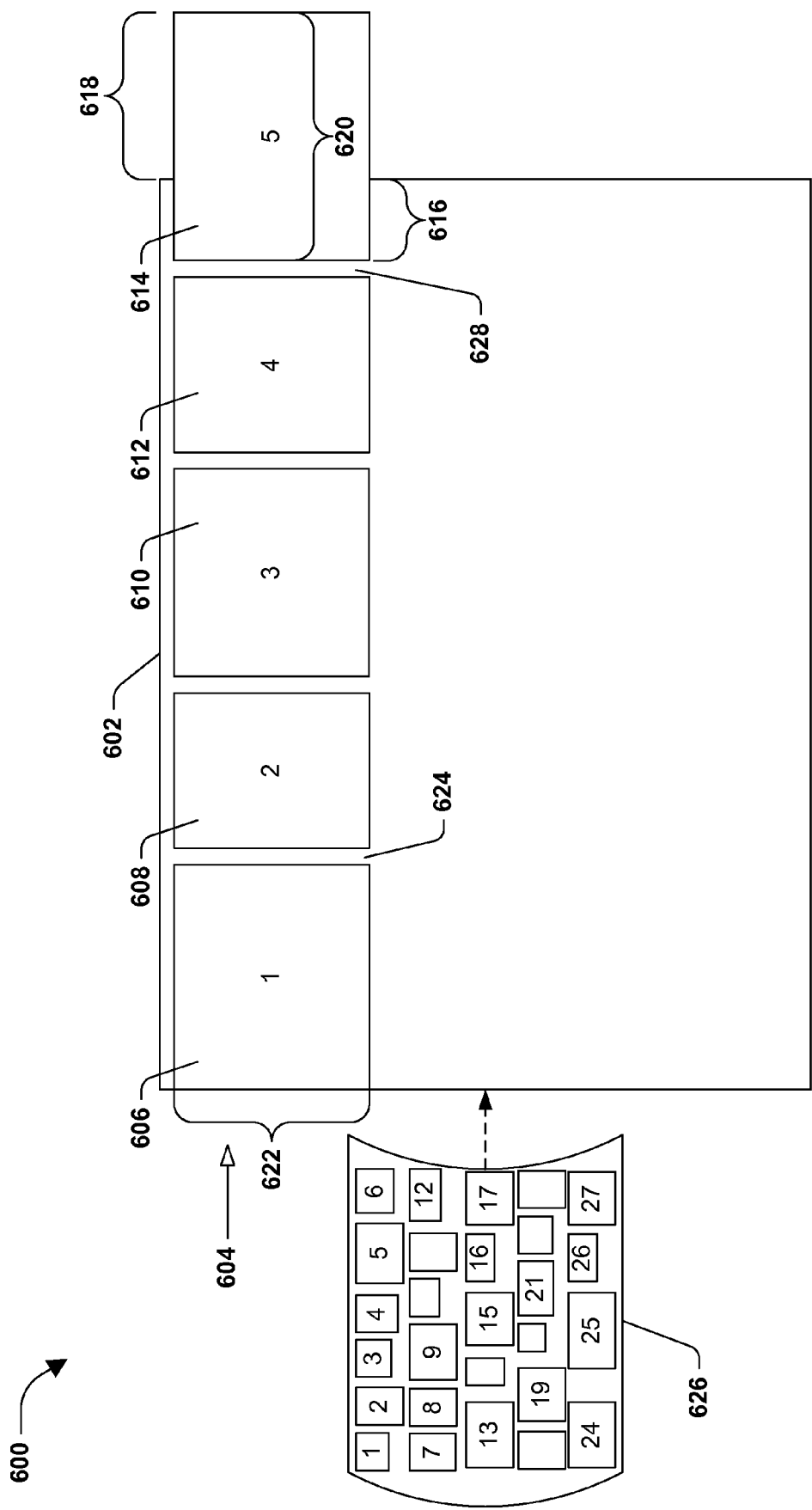
FIGS. 6A, 6B, and 6C are example embodiments respectively illustrating an example implementation of one or more portions of one or more techniques described herein.
Figure 6B:
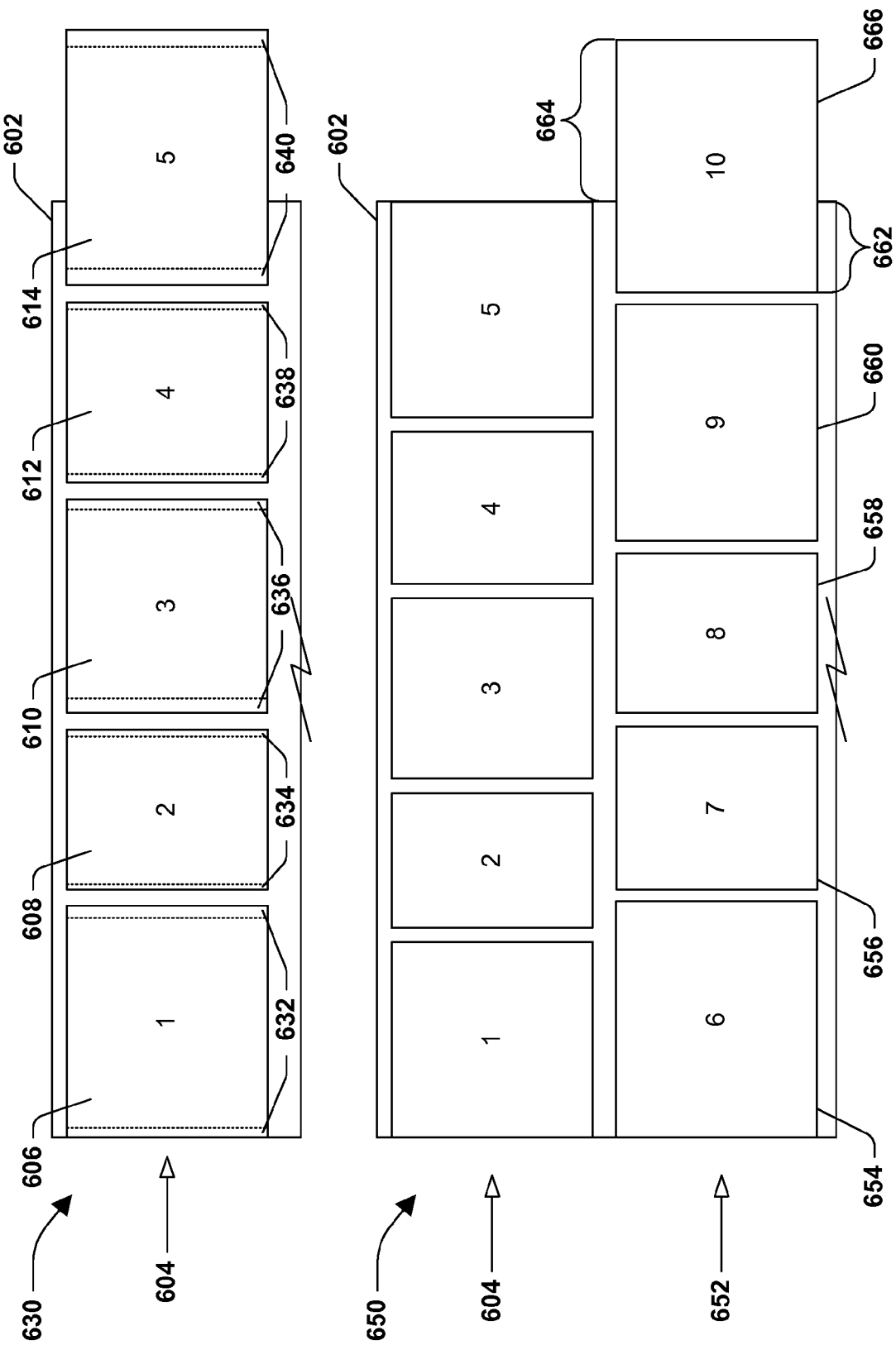
Figure 6C:
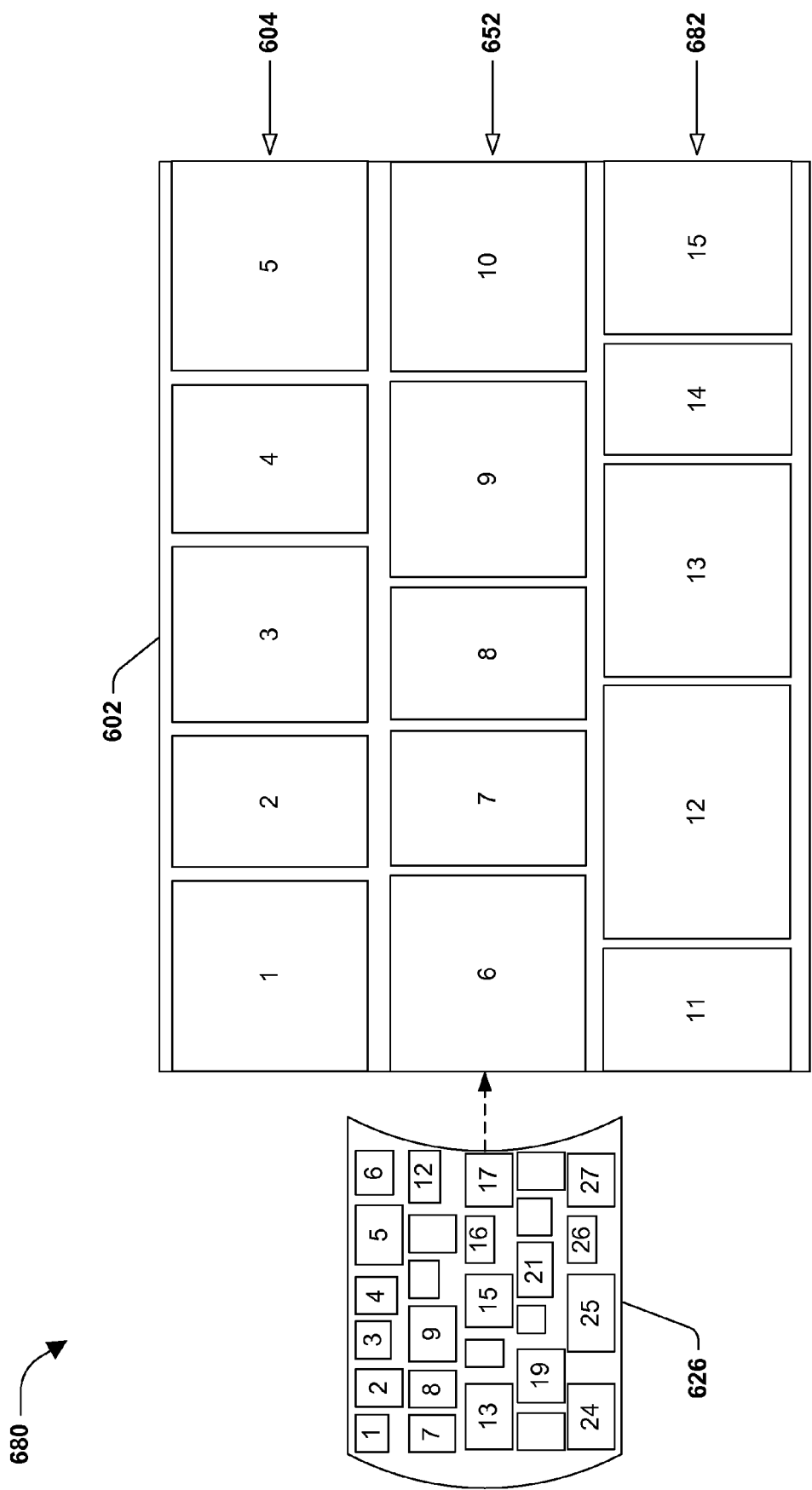

At 504 in the example embodiment 500, the selected image can be scaled to a desired height and/or width, for example, where the desired height may comprise a height of a first display line (e.g., row), and the desired width may comprise a width of a first display line (e.g., column). As an illustrative example, FIGS. 6A, 6B and 6C are example embodiments 600, 630, 680 respectively illustrating an example implementation of one or more portions of one or more techniques described herein. In this example, the image set 626 comprises a plurality of images (1-27) (e.g., comprising data indicative of the respective images in the set 626). Further, in this example 600, a first display line 604 in a display 602 comprises a row into which one or more images 606, 608, 610, 612, 614 may be filled.

Further, in this example 600, the first display line 604 (row) can comprise a desired display line height (row height), for example, which may be set programmatically by an application and/or may be set by a user. In one example, the selected image can be scaled to the desired display row height while keeping an original aspect ratio of the selected image. As an illustrative example, in FIG. 600, a first display line height 622 may comprise one hundred and seventy pixels (e.g., one third of a desired height of the display 602 minus desired margins between rows and/or edges of the display 602). In this example, the selected image (e.g., image 1) may be scaled to comprise a height of one hundred and seventy pixels, while maintaining its original aspect ratio. In one example, if the aspect ratio of the selected image is 4:3, the resulting scaled image may comprise the height of one hundred and seventy pixels and a width of two hundred and twenty seven pixels.

It will be appreciated that scaling an image can comprise applying a scaling factor to the image that may result in a reduced image size (e.g., using a positive scaling factor), an increased image size (e.g., using a negative scaling factor), or a same sized image (e.g., using a scaling factor of zero). Typically, when multiple images are organized in a display, the resulting images comprise "thumbnail" versions of the original image, where the thumbnail is a reduced version of the original image. However, for example, an original image may comprise a size smaller than that prescribed by the display line, and/or a same size as prescribed by the display line. In this example, the image may be scaled by increasing the image size, and/or may be scaled by keeping a same image size (e.g., applying a zero scaling factor to the image).

Returning to FIG. 5, at 506, an amount of remaining display space for a display line can be determined. In one embodiment, the amount of the remaining display space can comprise a difference between a size of the display line and a combined size of one or more images that have been filled into the display line. As an example, if the selected image comprises a first image selected from the image set 550, and the display line comprises the first display line of the display, the amount of remaining display space can comprise the size of the first display line (e.g., no images have been filled into the display line yet). Further, in this example, as selected images are respectively filled into the display line (e.g., a first, second, third and fourth, etc. selected image) the amount of remaining display space may be reduced by an amount of the respective selected images.

As an illustrative example, in FIG. 6A, prior to any of the scaled images 606, 608, 610, 612 being filled into the first display line 604, the amount of remaining display space can comprise a size of the first display line 604. Further, in this example, after a first scaled image 606 is filled into the first display line 604, the remaining display space comprises the size of the first display line 604 less the size of the first scaled image 606 (e.g., and a margin 624 between images). Additionally, after a second 608, a third 610, and a fourth 612 scaled image is filled into the first display line 604 a remaining display space 616 comprises the size of the first display line 604 less a combination of the sizes of the filled scaled images 606, 608, 610, 612 (e.g., combined with one or more margin 624 amounts).

Returning to FIG. 5, at 508, a size of the selected scaled image can be determined. As an example, the size of the selected may be determined by measuring a width and/or height of the selected image. In one example, where the first display line comprises a row, the width of the selected scaled image may comprise the size of the selected image, as a height of the selected scaled image may already be determined by the desired height of the display row (e.g., to which the selected image was scaled). In another example, where the first display line comprises a column, the height of the selected scaled image may comprise the size of the selected image, as a width of the selected scaled image may already be determined by the desired width of the display column.

At 510, it can be determined whether the selected scaled image will fit into the display line. As one example, if the selected scaled image comprises a first image selected for filling in a first display row, and a size of the first display row is not less than a size of the first image, the first image can fit into the first display line. As an illustrative example, in FIG. 6A, images 606, 608, 610, 612 (images 1-4) may respectively fit into the first display line 604 of the display 602. In one embodiment, determining whether the selected scaled image will fit into the display line can comprise comparing the amount of remaining display space (e.g., from 506) with the size of the selected scaled image (e.g., from 508). If the size of the selected scaled image is less than or equal to the remaining display space, the selected scaled image can fit into the display line (Yes at 510), and the selected scaled imaged can be filled into the display line.

Further, a next image (e.g., a second image) can be selected from the image set 550 (if available), at 502. The process 502 to 512 can be iterated for respective selected images (e.g., 606, 608, 610, 612), for example, until a selected scaled image does not fit into the display line. As an example, if the size of the selected scaled image is greater than the remaining display space, the selected scaled image will not fit into the display line (NO at 510). As an illustrative example, in FIG. 6A, the selected scaled image can comprise image five 614. In this example 600, a size 620 of the selected scaled image 614 (image 5) is greater than a remaining display space 616 for the first display line 604 of the display 602.

Returning to FIG. 5, at 514, an amount of additional display space can be determined for the display line. In one example, when combined with the remaining display space (e.g., 616 of FIG. 6A) for the display line, the additional display space may comprise a sufficient size to accommodate a cropped version of the scaled image (e.g., 614 of FIG. 6) in the display line. In one embodiment, the amount of additional display space can comprise a difference between the size of the scaled image and the amount of the remaining display space. As an illustrative example, in FIG. 6A, the amount of additional display space 618 can comprise a difference between the size 620 of the selected scaled image 614 and the amount of the remaining display space 616 (e.g., subtract the amount of the remaining display space from an amount of display space covered by the size of the scaled image).

Returning to FIG. 5, at 516, a cropping amount can be determined for the images in the display line, comprising the images already filled into the display line (e.g., 606, 608, 610, 612 of FIG. 6A), and the selected scaled image that did not fit into the display line (e.g., 614 of FIG. 6A). In one embodiment, the cropping amount can comprise the amount of additional display space that may be needed to "fit" the scaled image into the display line. Further, in one embodiment, an image cropping amount can be determined for the respective one or more images that are filled into the first display line, where the image cropping amount can comprise at least a portion of the amount of the additional display space.

In one example, the cropping amount for the display line (e.g., equivalent to the additional display space) can be divided among the respective image cropping amounts for the images in the display line (e.g., comprising the previously filled images and the image that does not "fit" into the display line). In one embodiment, the cropping amount for the display line can be divided into proportional image cropping amounts, for example, where a first image cropping amount may be proportional to a first image portion of the display line indicated by a first image in the display line. That is, for example, a larger image may comprise a larger portion (e.g., width and/or height) of the display line (e.g., row and/or column), and may therefore have a larger portion of the cropping amount, resulting in a larger amount of that image being cropped; while a smaller image may comprise a smaller portion of the display line, and may therefore have a smaller portion of the cropping amount, resulting in a smaller amount of that image being cropped.

As an illustrative example, in FIG. 6B, the example embodiment 630 comprises a portion of the display 602, which comprises the first display line 604 (row). In this example 630, images one to five 606, 608, 610, 612, 614 have respectively been assigned a portion 632, 634, 636, 638, 640 of the cropping amount for the first display line. Further, in this example, the portion 632, 634, 636, 638, 640 assigned to the respective images 606, 608, 610, 612, 614 varies among the different images 606, 608, 610, 612, 614. As illustrated in the example embodiment 630, image five 614 comprises a larger size than image two 608. Accordingly, more of (the larger) image five 614 is cropped than (the smaller) image two 608.

In one embodiment, determining the image cropping amount for a first image filled into a first display line can comprise identifying an image portion for the first image, where the image portion comprises the portion of a combined display image amount that is comprised by the first image (e.g., how much of the combined images in the first row is taken up by the width of the first image, such as a percentage). Further, in this embodiment, the image portion for the first image can be combined with the amount of the additional display space for the first display line, resulting in the image cropping amount for the first image. As an example, in order to determine a proportional amount to crop from the first image, a percentage of the first display taken up by the first image can be identified and combined with (e.g., multiplied by) the amount of the additional display space.

As an illustrative example, a first display row may comprise a width of five-hundred and fifty pixels; a first image may comprise a width of one-hundred and fifty pixels; a second image may comprise a width of seventy-five pixels; a third image may comprise a width of one-hundred and fifty pixels; a fourth image may comprise a width of one-hundred and fifty pixels; and a second image may comprise a width of seventy-five pixels. When the five image widths are added, the total width of the images is six hundred pixels, which is fifty pixels more than the first display row width.

In this example, an image portion can be determined for each of the five images by determining a percentage the image width is of the total width of all of the images combined (six-hundred pixels). The image portion for image one comprises 25% (e.g., 150/600*100); the image portion for image two comprises 12.5% (e.g., 75/600*100); the image portion for image three comprises 25%; the image portion for image four comprises 25%; and the image portion for image two comprises 12.5%. Further, in this example, the percentage for the respective images in the first display row can be combined with the additional display space (fifty pixels) to determine the image cropping amount for each image. For images one, three and four, the cropping amount can comprise twelve and one half pixels (e.g., 25% of 50 pixels); and, for images two and five, the cropping amount can comprise six and one quarter pixels (e.g., 12.5% of 50 pixels).

Returning to FIG. 5, at 518, the respective one or more images in the display line can be cropped. In one embodiment, the respective images can be cropped on two sides, for example, where an equivalent amount of the image is cropped from either side (e.g., a top and bottom side, and/or a left and right side). In this embodiment, a first side of the first image can be cropped by up to half of the image cropping amount for the first image; and/or a second side of the first image can be cropped by at least half of the image cropping amount for the first image. As an example, a left side of images one, three and four (in the above example) can be cropped by six and one quarter pixels (e.g., twelve and one half pixels divided in half); and a right side of images one, three and four can also be cropped by six and one quarter pixels. As another example, the left side of images one, three and four may be cropped by six pixels; and the right side of images one, three and four may also be cropped by seven pixels.

At 512, the scaled and cropped image (e.g., image five 614 of FIG. 6B) can be filled into the first display row. As an illustrative example, in FIG. 6B, in the example embodiment 630, the image cropping amount 623, 624, 636, 638, 640 can be cropped from the respective images 606, 608, 610, 612, 614, and the scaled, cropped image five 614 can be filled into the first display row. In the example embodiment 650, the display 602 comprises the first display line 604 where the respective images "fit" into the display line after the cropping.

In one embodiment, a desired margin may be disposed between one or more of the images in the display line (e.g., and/or an image and an edge of the display line). As an illustrative example, in FIG. 6A, a margin 624 (e.g., a buffer comprising blank pixels) is disposed between the respective images 606, 608, 610, 612, 614 in the first display line 604 of the display 602. In one embodiment, an amount of display space comprised by one or more margins may be combined with the one or more images in the display line to determine an amount of remaining display space. In this embodiment, a selected image (e.g., and scaled) may be filled into the display line merely if a size of a desired margin, combined with a size of the selected image is not greater than an amount of remaining display space in the display line.

As an illustrative example, in FIG. 6A, the remaining display space 616 is determined by combining the amounts of the respective filled images 606, 608, 610, 612 with the respective amounts of the margins 624 between the images 606, 608, 610, 612. Further, in this example 600, the amount 620 (width) of the fifth image 614 can be combined with an amount of a desired margin 628 between the fourth 612 and fifth 614 images. In this example, the combined amount of image five 614 and its margin 628 is greater than the remaining display space. Therefore, in this example, the respective images 606, 608, 610, 612, 614 can be cropped to "fit" into the first display row 604.

Returning to FIG. 5, at 520, a next line (if available) may be filled with one or more images from the image set 550. In one embodiment, a next incrementally selected image, from the set of sequentially arranged images 550, can be filled into a next display line if a size of the next incrementally selected image is not greater than an amount of remaining display space in the next display line. As an illustrative example, in FIG. 6B, the example embodiment 650 comprises a second display row 652. The second display row may be filled (e.g., using the iterative process 502 to 512 of FIG. 5) with images six to nine 654, 656, 658, 660 from the image set (e.g., 626 of FIG. 6A). In this example 650, the tenth image 666 does not fit into the second display row 652, and the respective images 654, 656, 658, 660, 666 can be cropped (e.g., using the process 514 to 518 of FIG. 5).

Further, as an example, a third row (e.g., and fourth, etc.) may be filled accordingly (if available). As an illustrative example, in FIG. 6C, the display 602 comprises the first display row 604, the second display row 652, and a third display row 682, where images 1-15 have been incrementally selected from the image set 626, scaled, cropped, and filled into the respective display rows 604, 652, 682. A resulting display 602 comprises the images one through fifteen efficiently organized, for example, where an amount of wasted white space is mitigated, a large amount of the viewable portion of the respective images is maintained, and an aspect ratio of the images is substantially maintained to provide a more desirable user (viewing) experience.

A system may be devised that can provide an efficient arrangement of images in a display, such that "white-space" is mitigated, and where the images are displayed at aspect ratios similar to original versions of the images. Further, display lines (e.g., rows and/or columns) in the efficient arrangement can comprise images that are of a same dimension (e.g., width and/or height), which may provide an improved user experience. In the efficient arrangement, the images may be resized dynamically, as a size and/or dimensions of the display are adjusted. In one embodiment, one or more portions of the system can be used to fill a display row in the display with images, and when a last image is filled in the row, merely a portion of respective images in the row can be proportionally cropped to accommodate the last image.

Figure 7:
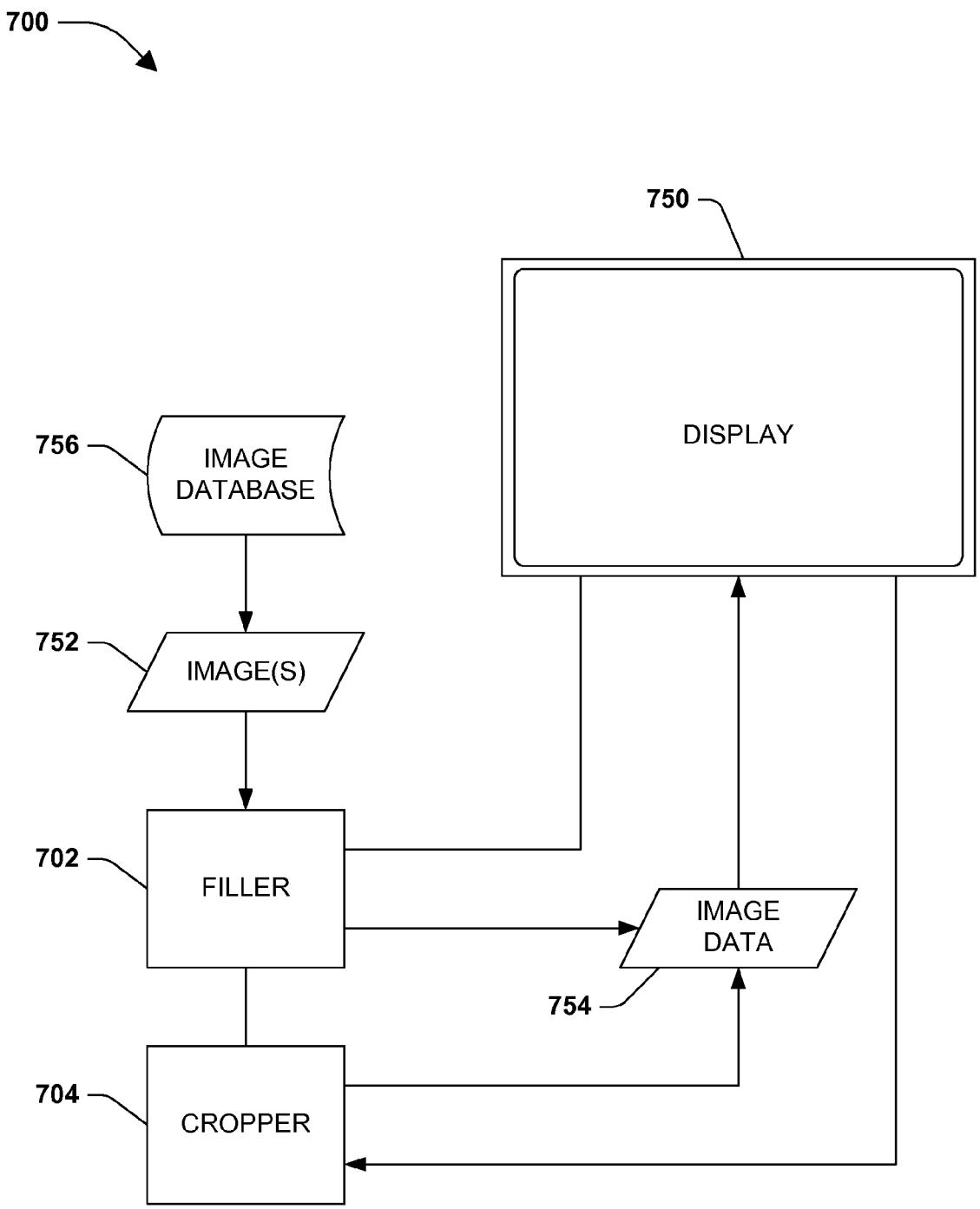
FIG. 7 is a component diagram illustrating an exemplary system for organizing images in a display.

FIG. 7 is a component diagram illustrating an exemplary system 700 for organizing images in a display. The exemplary system 700 comprises a filling component 702 that is operably coupled with a display component 750 (e.g., a display connected to a computer, or comprised in a computing device). The filling component 702 is configured to fill an image 752 into a first display line of the display 750 if a size of the image 752 is not greater than an amount of remaining display space in the first display line. Further, the filling component 702 is configured to fill a cropped version of the image into the first display line if the size of the image 752 is greater than the amount of the remaining display space.

In the exemplary system 700, a cropping component 704 is operably coupled with the filling component 702. The cropping component 704 is configured to crop one or more images filled into the first display line of the display 750 (e.g., including the image 752) by a cropping amount, if the size of the image 752 is greater than the amount of the remaining display space. The cropping amount, when combined with the amount of the remaining display space, may be of sufficient size to accommodate the cropped version of the image in the first display line.

In one example, the filling component 702 can receive (e.g., either pushed or pulled from an image database 756) a first image 752. The filling component 702 may receive information (e.g., either pushed or pulled) from the display 750 that identifies the amount of remaining display space in a first display line. The filling component can identify that the first image can "fit" into the first display line, based on a size of the first image and the amount of remaining display space, and forward the first image 752 as image data 754 to the display 750 to be filled into the first display line. Further, in this example, a second image 752 can be received from the image database 756 (e.g., and third and fourth, etc.) and filled into the first display, at least until the received image does not "fit" into the first row.

In this example, when a received image does not fit into the first display row, the cropping component can identify how much additional display space may be needed to "fit" the image. The cropping component 704 can identify a cropping amount, based at least upon the additional display space, and crop the respective images (e.g., including the image that does not fit) in the first display line. Once cropped, the filling component can fit the received and cropped image into the first display line on the display 750.

Figure 8:
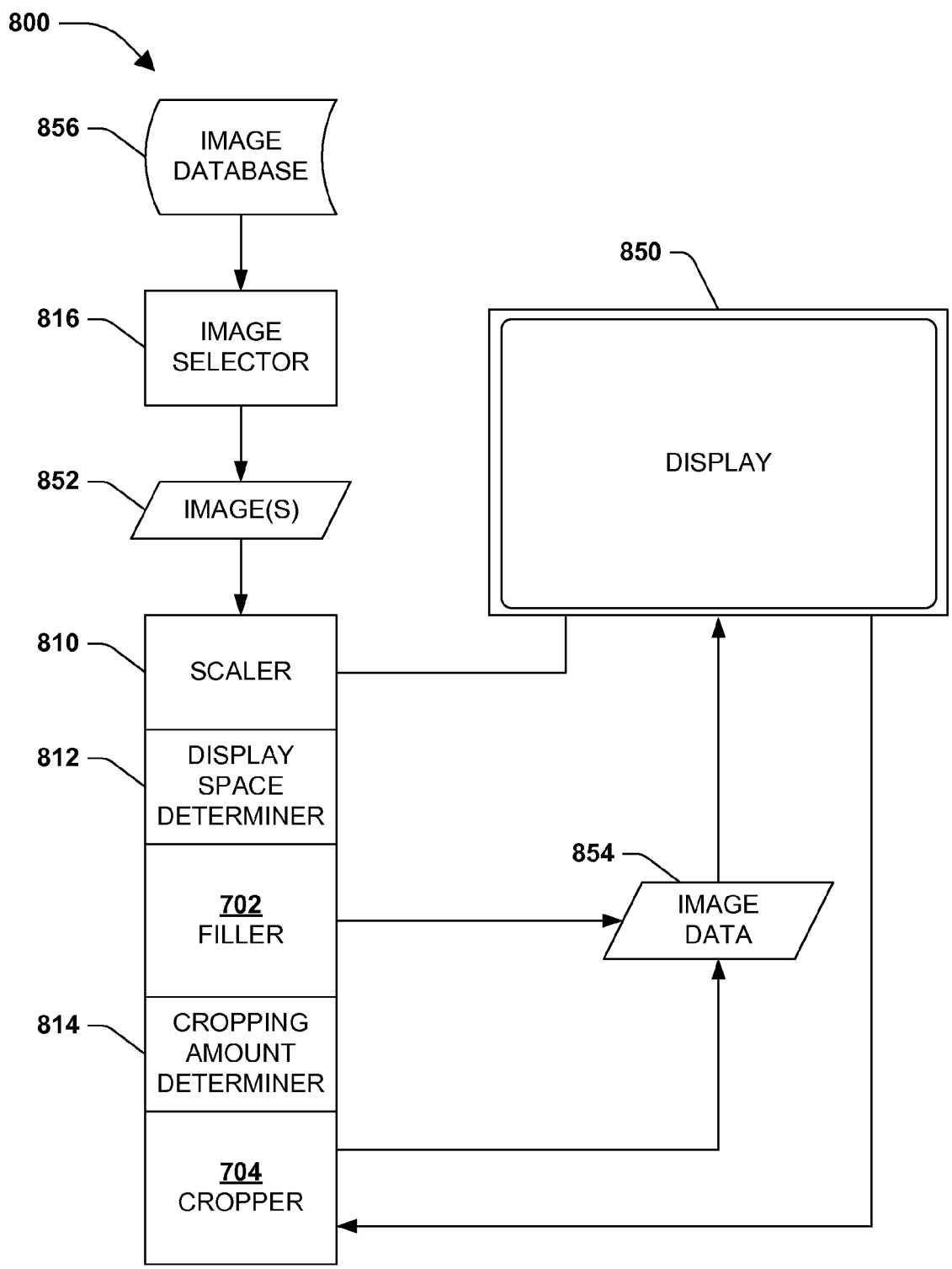
FIG. 8 is a component diagram illustrating and example embodiment where one or more systems described herein may be implemented.

FIG. 8 is a component diagram illustrating an example embodiment 800 where one or more systems described herein may be implemented. In this example 800, an extension of FIG. 7 is provided and thus description of elements, components, etc. described with respect to FIG. 7 may not be repeated for simplicity. In this example, a scaling component 810 can be configured to scale an original image 852 from an image database 856, resulting in an image which may be filled into a display line of a display 850. The scaling component 810 can adjust a height of the original image 852 to a desired height while maintaining an image aspect ratio. Further, the scaling component 810 may adjust a width of the original image 852 to a desired width while maintaining the image aspect ratio. As an example, the original image 852 may be scaled in height to fit a desired height of a display row for the display 850. As another example, the original image 852 may be scaled in width to fit a desired width of a display column for the display 850.

In the example embodiment 800, a display space determination component 812 can be configured to determine an amount of remaining display space, such as in a display row of the display 850. The amount of the remaining display space can comprise a difference between a size of the display line and a combined size of one or more images filled into the display line. Further, in one embodiment, the display space determination component 812 can be configured to determine a cropping amount for the display line, where the cropping amount can comprise a difference between the size of the image 852 (e.g., being filled into the display line) and the amount of the remaining display space. As an example, the display 850 can comprise one or more first images that have already been filled in the display line. In this example, a second image may not "fit" into the display line, and the display space determination component 812 can identify the cropping amount for the one or more first images and the second image, such that, once cropped, the second image can also "fit" into the display line.

A cropping amount determination component 814 can be configured to determine an image cropping amount for the respective images in the display line. The cropping amount determination component 814 can determine an image portion for a first image, where the image portion comprises a portion of the first display line that is comprised by the first image. Further, cropping amount determination component 814 can combine the image portion for the first image with the cropping amount (e.g., from the display space determination component 812) resulting in the image cropping amount for the first image. Additionally, the cropping amount determination component 814 can divide the image cropping amount into two image cropping portions comprising a first image cropping portion comprising up to half of the image cropping amount for the first image, and/or a second cropping portion comprising at least half of the image cropping amount for the first image.

In one embodiment, the respective images in the first display line may be cropped, by the cropping component 704, from a first side by the first image cropping portion, and/or from a second side by the second image cropping portion. As an example, the cropping component 704 can crop respective image in the display line from a left and right side (e.g., for a display row), and/or from a top and bottom side (e.g., for a display column).

In the example embodiment 800, an image selection component 816 can be configured to incrementally select an image 852 from a set of sequentially arranged images, such as stored in the image database 856. As an example, the image database may comprise an image set comprising a plurality of images that are arranged sequentially, based on some associated metadata (e.g., time, keywords, size, etc.), and the image selection component 816 can select a next image from the image set, where the next selected image comprises a next image in the sequence.

In one embodiment, the filling component 702 can be configured to fill an other image into a second display line if a size of the other image is not greater than an amount of remaining display space in the second display line. For example, after the first display line is filled, such as by cropped image data 854, a second display line may be filled with sequentially selected images 852 from the image database 856. In this example, as described above, the second display line can be filled at least until a selected image does not "fit" into the second display line. In this example, the display space determination component 812 can determine a cropping amount for the selected image, the cropping amount determination component 814 can determine an image cropping amount for respective one or more images in the second display line, the cropping component 704 can crop the respective images in the second display line, and the filling component 702 can fill the respective one or more images into the second display line of the display 850. In one embodiment, a third display line may also be filled (e.g., and a fourth, fifth, etc., as determined by the display).

Figure 9:
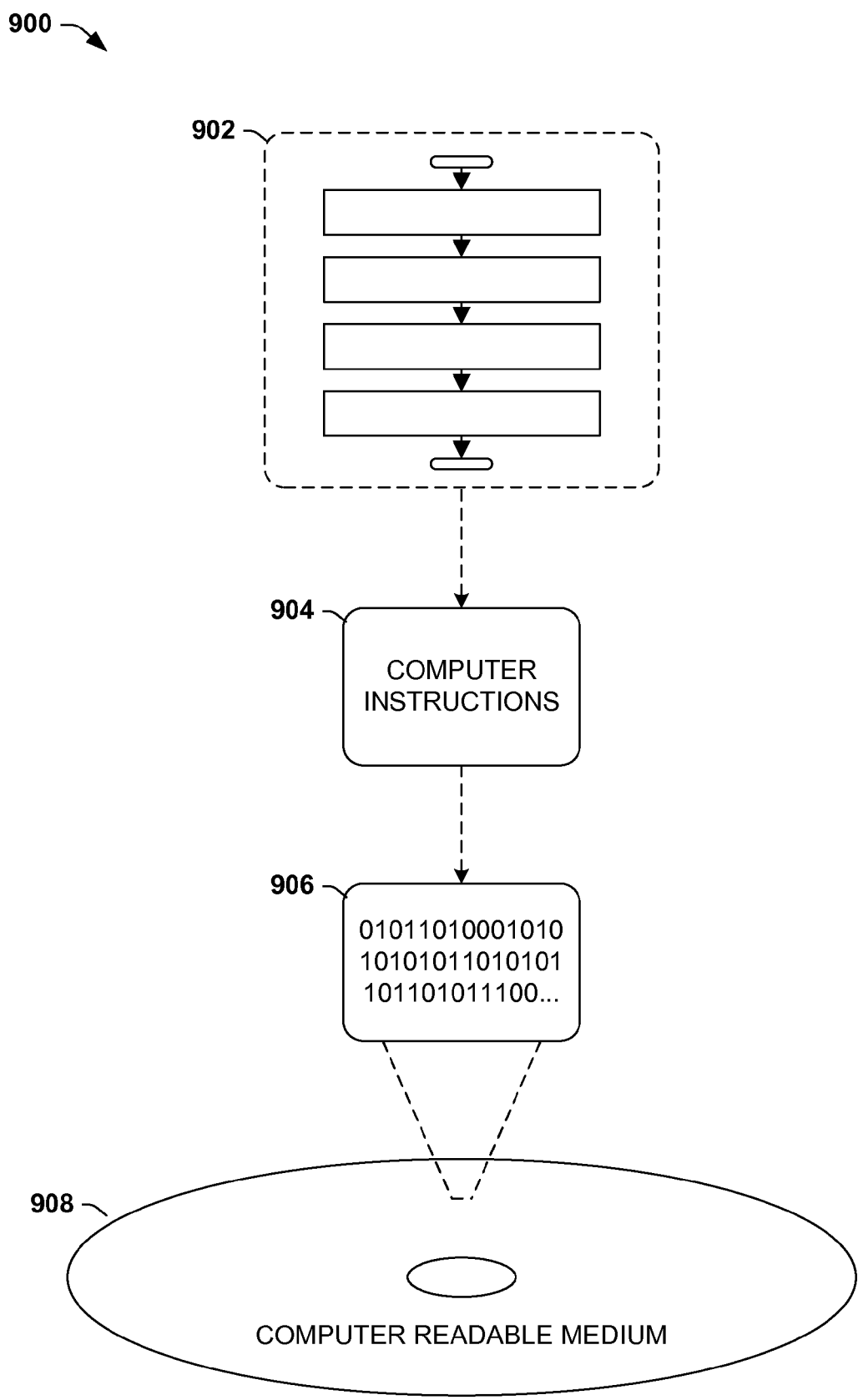
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as at least some of the exemplary method 400 of FIG. 4, for example. In another such embodiment, the processor-executable instructions 904 may be configured to implement a system, such as at least some of the exemplary system 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
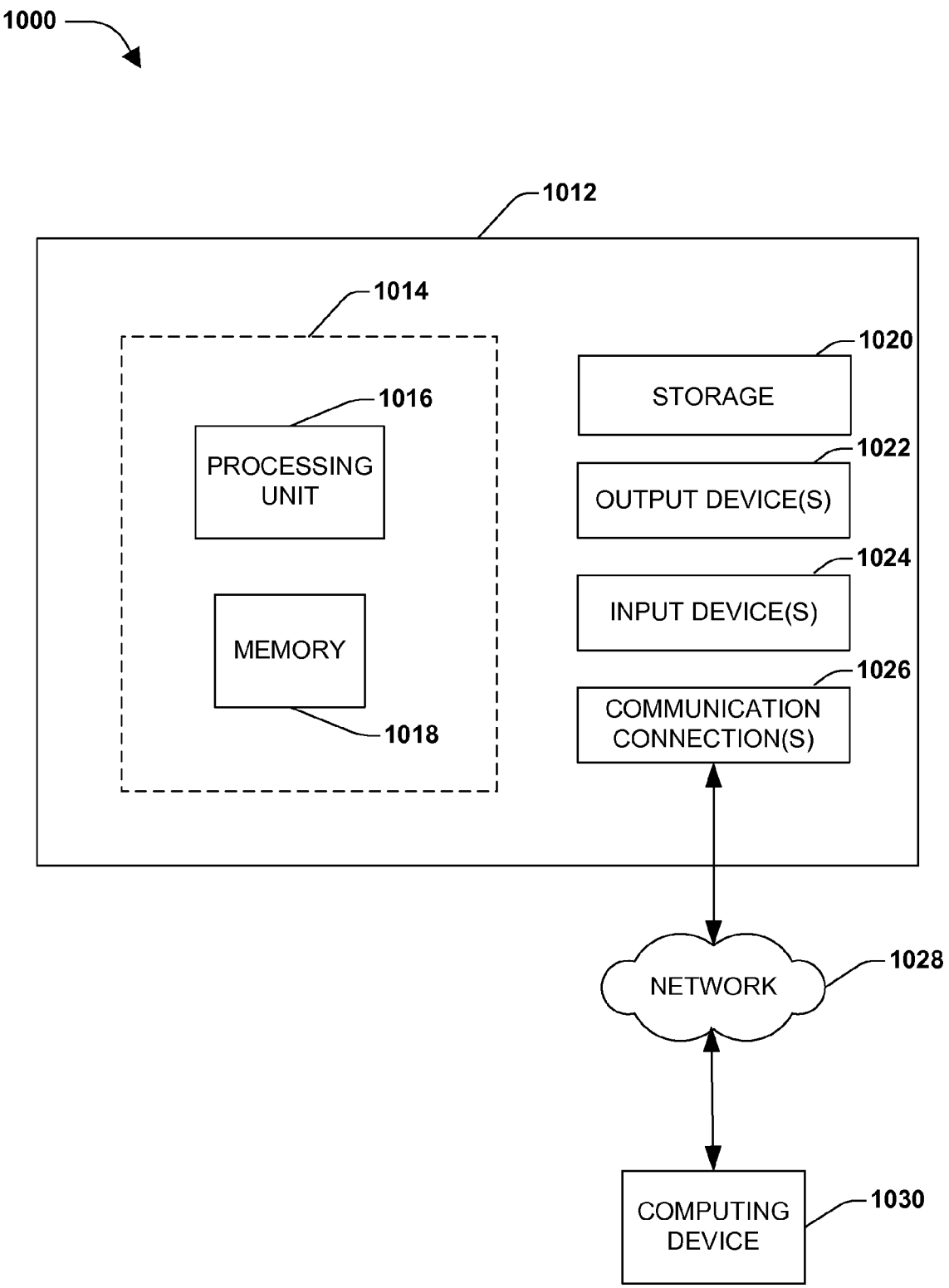
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:

filling an image into a first display line responsive to a size of the image not being greater than an amount of remaining display space in the first display line, the amount of the remaining display space comprising a difference between a size of the first display line and a combined size of one or more images filled into the first display line before the filling an image, the one or more images different than the image, the image not in the first display line prior to the filling an image; and responsive to the size of the image being greater than the amount of the remaining display space:

cropping the one or more images that are different than the image and that are filled into the first display line, the cropping resulting in an amount of additional display space that, when combined with the amount of the remaining display space, is sufficient to accommodate a cropped version of the image in the first display line, the additional display space not comprising a portion of the remaining display space; and filling the cropped version of the image into the first display line after the cropping, the cropped version of the image not in the first display line prior to the filling the cropped version, the method implemented via a processing unit.

2. The method of claim 1, comprising scaling an original image resulting in the image, the scaling comprising one or more of:
adjusting a height of the original image to a desired height while maintaining an image aspect ratio; or
adjusting a width of the original image to a desired width while maintaining the image aspect ratio.

3. The method of claim 1, the amount of the remaining display space different than the amount of the additional display space.

4. The method of claim 1, comprising determining the amount of the additional display space comprising determining a difference between the size of the image and the amount of the remaining display space.

5. The method of claim 1, comprising determining an image cropping amount for a first image of the one or more images filled into the first display line, the image cropping amount comprising at least a portion of the amount of the additional display space.

6. The method of claim 5, comprising determining an image portion for the first image, the image portion comprising a percentage of the one or more images in the first display line indicated by the first image.

7. The method of claim 6, comprising combining the image portion for the first image with the amount of the additional display space resulting in the image cropping amount for the first image.

8. The method of claim 5, cropping the one or more images filled into the first display line comprising one or more of:
cropping a first side of the first image by up to half of the image cropping amount for the first image; or
cropping a second side of the first image by at least half of the image cropping amount for the first image.

9. The method of claim 1, comprising incrementally selecting the image from a set of sequentially arranged images.

10. The method of claim 9, comprising filling a next incrementally selected image from the set of sequentially arranged images into a next display line responsive to a size of the next incrementally selected image not being greater than an amount of remaining display space in the next display line.

11. The method of claim 1, comprising filling an other image into a display line responsive to a size of a desired margin combined with a size of the other image not being greater than an amount of remaining display space in the display line.

12. The method of claim 11, the desired margin disposed between the other image and a second image in the display line.

13. A system, implemented via a processing unit, comprising:
a filling component configured to:
fill an image into a first display line responsive to a size of the image not being greater than an amount of remaining display space in the first display line, the amount of the remaining display space comprising a difference between a size of the first display line and a combined size of one or more images filled into the first display line before the image is filled into the first display line; and
responsive to the size of the image being greater than the amount of the remaining display space, fill a cropped version of the image into the first display line;
a cropping component configured to crop the one or more images filled into the first display line by a cropping amount responsive to the size of the image being greater than the amount of the remaining display space, the cropping amount, when combined with the amount of the remaining display space, sufficient to accommodate the cropped version of the image in the first display line; and
a cropping amount determination component configured to perform one or more of:
determine an image portion for a first image of the one or more images, the image portion comprising a portion of the first display line comprised by the first image;
combine the image portion for the first image with the cropping amount resulting in an image cropping amount for the first image; or
divide the image cropping amount into image cropping portions comprising one or more of:
a first image cropping portion comprising up to half of the image cropping amount for the first image; or
a second image cropping portion comprising at least half of the image cropping amount for the first image.

14. The system of claim 13, comprising a scaling component configured to scale an original image resulting in the image, the scaling comprising one or more of:
adjusting a height of the original image to a desired height while maintaining an image aspect ratio; or
adjusting a width of the original image to a desired width while maintaining the image aspect ratio.

15. The system of claim 13, comprising a display space determination component configured to:
determine the amount of the remaining display space.

16. The system of claim 13, the first image cropping portion equal to the second image cropping portion.

17. The system of claim 13, the cropping component configured to at least one of:
crop a first side of the first image by the first image cropping portion; or
crop a second side of the first image by the second image cropping portion.

18. The system of claim 13, comprising an image selection component configured to incrementally select the image from a set of sequentially arranged images.

19. The system of claim 13, the filling component configured to fill an other image into a second display line responsive to a size of the other image not being greater than an amount of remaining display space in the second display line.

20. A computer readable device comprising instructions that when executed perform a method, comprising:
cropping one or more images filled into a first display line responsive to a size of an image being greater than an amount of remaining display space in the first display line prior to the cropping, the cropping comprising cropping a first image of the one or more images by a percentage of a measure of the first image and cropping a second image of the one or more images by the percentage of a measure of the second image, the cropping resulting in an amount of additional display space that, when combined with the amount of the remaining display space, is sufficient to accommodate a cropped version of the image in the first display line, the additional display space not comprising a portion of the remaining display space.

* * * * *